United States Patent Office 2,838,462
Patented June 10, 1958

2,838,462
CATALYST FOR CARBON MONOXIDE OXIDATION

Robert N. Pease, Princeton, N. J., assignor to the United States of America as represented by the Secretary of the Army No Drawing. Application March 20, 1956
Serial No. 572,776

1 Claim. (Cl. 252—471)

The invention described herein may be manufactured and used by or for the Government of the United States of America for governmental purposes without the payment to me of any royalty thereon.

This invention relates to new catalysts and to methods of preparing same. More specifically, this invention relates to the production of catalysts comprising manganese oxides together with other metallic oxides.

Catalysts of this type have been found useful in converting oxidizable substances present in gases and/or vapors into oxidized products. In particular, carbon monoxide contained in atmospheric air is susceptible to oxidation when same is brought into contact with such catalysts.

While it is known that mixtures of manganese dioxide and other metallic oxides, e. g. oxides of silver, cobalt, and copper, are capable of catalyzing the oxidation of carbon monoxide, it has been also found that these commercial catalysts have certain disadvantages. For example, they have a tendency to be objectionably soft and powdery. In addition, it has been found that these known manganese dioxide-metallic oxide catalysts, or so-called "Hopcalite" type, are extremely sensitive to moisture, and at low temperatures their activity is substantially reduced.

It is an object of this invention to prepare a manganese dioxide catalyst of improved characteristics rendering it useful in oxidation processes, as in the oxidation of oxidizable gases such as carbon monoxide.

It is another object of this invention to prepare a novel manganese dioxide-metallic oxide catalyst which is more stable under adverse moisture conditions.

A further object of this invention is to provide a manganese dioxide-metallic catalyst suitable for use in oxidation processes which is unusually effective at low temperatures.

Other objects will in part appear in, and in part be obvious from the following detailed description.

The catalyst of the present invention is essentially a mixture of precipitated manganese dioxide with palladium and silver oxides, the latter being originally in the form of carbonates. The relative proportions of Pd:Ag:Mn is preferably in the atomic proportions of 1:2:3, respectively. Preparation of this novel catalyst can be divided into five parts: (1) the preparation of manganese dioxide; (2) the preparation of the palladium solution; (3) co-precipitation of palladium and silver as carbonates; (4) mixing of the manganese dioxide with the palladium-silver composition; and (5) drying and screening the catalyst.

A. PREPARATION OF THE MANGANESE DIOXIDE

The preparation of manganese dioxide requires moderate caution. The process involves the interreaction of manganous sulphate and potassium permanganate in concentrated sulphuric acid at elevated temperatures, preferably about 60° C. The process may be thought of as an initial formation of manganese heptoxide—

$$2KMnO_4 + H_2SO_4 \rightarrow Mn_2O_7 + K_2SO_4 + H_2O$$

followed by interreaction of the heptoxide with manganeous sulphate—

$$Mn_2O_7 + MnSO_4 + H_2O \rightarrow 3MnO_2 + H_2SO_4 + O_2$$

Since the heptoxide is an unstable and volatile substance, it will be appreciated that precautions should be taken in the preparation. It has been found that it is desirable to add about one gram of the potassium permanganate every 30 seconds. The addition should be so controlled that the temperature does not rise above the limits of 55° to 60° C. The operation is preferably conducted in a hood, or in a good draft since a little heptoxide inevitably escapes.

The following specific example is given to illustrate the preparation of the magnanese dioxide.

Example I

Manganese sulphate ($MnSO_4.H_2O$), in the amount of 56.3 grams (⅓ mole) is reduced by grinding to a fine state of subdivision, and introduced into 65 cc. of water, and stirred until it is uniform. To this solution there is slowly added, with stirring, 130 cc. of concentrated sulphuric acid (95%; density 1.84; about 2.3 moles acid). The addition of the sulphuric acid will cause a temperature rise to about 100° C. The mixture is cooled while stirring to about 55° C. Pure potassium permanganate ($KMnO_4$) in the amount of 52.7 grams (⅓ mole) is reduced to a finely divided material. This material is added slowly, a gram every 30 seconds, to the above mixture with the stirrer running continuously. This addition is carried on under a hood. After completing the addition of the powdered permanganate, the mixture is stirred an additional 15 to 30 minutes. It is now ready for addition to the remainder of the preparation.

B. PREPARATION OF PALLADIUM SOLUTION

The preparation of the palladium solution is a straight forward process. Essentially it involves the preparation of a water-soluble strong acid salt of palladium and the removal of impurities. It is desirable that the palladium carbonate be washed substantially free of chloride by decantation. This is a tedious process because the precipitate does not separate and settle readily. It is usually sufficient to bring the solution to boiling before settling.

The following example is illustrative of this step.

Example II

Two-ninths of a gram atom of palladium sponge (23.7 grams) is dissolved in about 120 cc. aqua regia (90 cc. conc. HCl and 30 cc. conc. $HNO_3$). Sodium carbonate decahydrate ($Na_2CO_3.10H_2O$) in the amount of 286 grams (1 mole) is dissolved in 1 liter of water. The palladium solution is then added to this slowly with stirring. The resulting precipitate of palladium carbonate is washed substantially free of chloride by decantation. The chloride-free precipitate is now treated with 300 cc. of concentrated $HNO_3$ (4.8 moles) and boiled until a clear solution is obtained and then allowed to cool. This solution is now ready to be mixed with the silver nitrate solution in the next step.

C. CO-PRECIPITATION OF PALLADIUM AND SILVER CARBONATES

This step is best illustrated by the following specific example.

Example III

Silver nitrate in the amount of 75.5 grams (4/9 mole) is dissolved in 150 cc. of water and added to the palladium nitrate solution prepared in accordance with Example II above. This mixture of silver and palladium nitrates is then added slowly with stirring to a solution of 800 grams of $Na_2CO_3 \cdot 10H_2O$ (2.8 moles) in 2 liters of water, which has been heated to about 50° C. Carbon dioxide is evolved. The resulting mixture should be slightly alkaline. NaOH in the amount of 195 grams (4.8 moles) is dissolved in 1 liter of water and added to the suspension of carbonates just prepared.

D. MIXING OF THE MANGANESE DIOXIDE WITH THE Pd–Ag COMPOSITION

This step is best illustrated by the following specific example:

Example IV

Sufficient water is added to the Pd–Gg carbonate suspension prepared in accordance with Example III to give a total volume of 10 to 12 liters. The manganese dioxide preparation from Example I is added slowly with stirring to this composition. The whole mixture should be slightly alkaline at this stage. It is now made slightly acid with sulphuric acid. One liter of water in which is dissolved 1 or 2 grams of $KMnO_4$ is added. Stirring is discontinued and the suspension is allowed to settle. After about 2 hours the precipitate should occupy a volume amounting to 10 to 20% of the total volume. The supernatant liquid is siphoned off and 10 to 15 liters of water in which is dissolved a gram or two of $KMnO_4$ is added. This procedure is repeated until a faint test for sulphate is obtained.

E. DRYING AND SCREENING OF THE CATALYST

This step is best illustrated by the following example:

Example V

After siphoning off the excess water from the final washing in Example IV, the suspension is filtered on a large (8 to 12 inches) Buchner funnel to give a filter-cake about 1 inch in thickness. The cake is placed in a large evaporating dish and dried overnight in an oven at 110° C. The cake is then ground and screened to 10 to 20 mesh.

A final activation at 200° C. for 2 hours in dry air is preferable. For this purpose a glass tube is filled with the catalyst and placed in a suitable electric heater or vapor bath. Air, which has been dried (e. g. in a $CaCl_2$ drying power) is passed through the charge at about 2 liters per minute. The catalyst is bottled direct from the drying tube while still hot, and the bottle is sealed.

It will be understood that the examples set forth above are merely illustrative of the present invention. The invention is not intended to be limited except as defined in the claims.

I claim:

A catalyst for vapor phase oxidation which consists of an intimate mixture of manganese dioxide, silver oxide, and palladium oxide in the relative atomic proportions of the metals of 3:2:1 respectively.

References Cited in the file of this patent

UNITED STATES PATENTS

| | | |
|---|---|---|
| 1,345,323 | Frazer | June 29, 1920 |
| 2,407,066 | Dunlop | Sept. 3, 1946 |
| 2,437,706 | Paterson | Mar. 16, 1948 |
| 2,666,756 | Boyd et al. | Jan. 19, 1954 |

OTHER REFERENCES

Gregory: "Uses and Applications of Chemicals and Related Materials," vol. I, Reinhold Publ. Co. (1939), pp. 365, 433.